United States Patent [19]
Yoshikawa

[11] 3,752,005
[45] Aug. 14, 1973

[54] BRAKE FOR BICYCLES

[76] Inventor: Tomizo Yoshikawa, Lot 9 of 10 Ban, 2 Chome, Imaike-cho, Sakai-shi, Osaka, Japan

[22] Filed: Dec. 8, 1971

[21] Appl. No.: 205,840

[30] Foreign Application Priority Data
Dec. 10, 1970   Japan.............................. 45/123791

[52] U.S. Cl. ................................ 74/480 R, 74/489
[51] Int. Cl........................................... G05g 11/00
[58] Field of Search................. 74/480 R, 488, 489; 188/24–27

[56]   References Cited
UNITED STATES PATENTS
581,444   4/1897   Valentine.......................... 74/488 X
627,912   6/1899   Farfan................................ 188/27
3,403,577   10/1968   Ozaki.................................. 74/480
3,596,530   8/1971   Yoshigai.......................... 74/489 X

*Primary Examiner*—Allan D. Herrmann
*Attorney*—Moonray Kojima

[57]   ABSTRACT

A brake for drop handle type bicycles characterized in that a brake lever comprising a main lever and an auxiliary lever mounted to a drop handle portion of a bicycle can be operated with a cyclist's fingers reaching therefor from any optional gripping positions of the drop handle thereby enabling him to apply the brake exactly so as to wheel on with safety.

7 Claims, 11 Drawing Figures

Patented Aug. 14, 1973  3,752,005

INVENTOR.
TOMIZO YOSHIKAWA
BY
ATTORNEY

Patented Aug. 14, 1973 3,752,005

INVENTOR.
TOMIZO YOSHIKAWA
BY
ATTORNEY

BRAKE FOR BICYCLES

The present invention relates to a brake for bicycle and more particularly it relates to such an improved drop type bicycle handle brake that can be operated with a cyclist's fingers from any optional gripping positions of the drop handle by means of a brake lever which is comprised of a main lever and an auxiliary lever and mounted to a suitable portion of the drop handle so as to put on the brake pertinenty and exactly thereby enabling the cyclist to ride on a bicycle with safety.

The aforesaid drop type bicycle handle brake has been conventionally known as is described for example in the specification forming part of the U. S. Letters Patent No. 3,403,577, and according to which a brake lever comprising a main lever and an auxiliary lever is adapted to be controlled through means of the auxiliary lever so as to operate the main lever; thus bringing about a difficulty that a cyclist cannot but unnaturally overstrain himself to secure the desired effective braking operation of the brake.

In order to eliminate this and other difficulties of the conventional drop type bicycle handle brakes in mind, I conducted many experimental researches for improvements in such brakes and succeeded in designing the present invention.

Accordingly, it is one of the principal objects of the present invention to effect the braking operation of the brake by effectively manipulating either a main lever or an auxiliary lever constituting a brake from any optional gripping position of the drop handle with a cyclist's fingers extended to either of said levers while grasping said position.

It is another object of the invention to effect the braking operation of the brake by directly manipulating the auxiliary lever thereby to avoid the defects that go with the main lever to be operated through an auxiliary lever in accordance of the conventional brake.

It is a still further object of the invention to provide a bracket means that can be exactly fixed to a handle portion thereby to rotatably support said main lever and said auxiliary lever.

The detailed description of the invention is as set forth hereinafter and the novel features of the invention is as claimed in appended claims.

Now referring to the accompanying drawings illustrating one preferred embodiment of the invention, in which.

Figure 1:
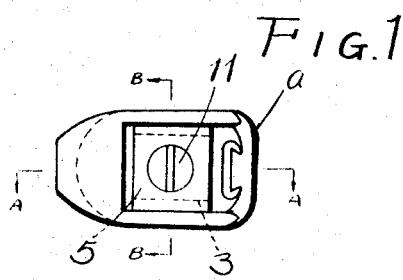
FIG. 1 is a plan view of a bracket for fitting a brake lever.
Figure 3:
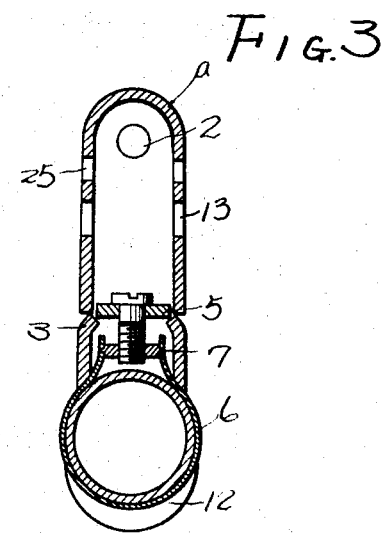
FIG. 3 is a vertical sectioned view of the same bracket taken on the line of B — B of FIG. 1.
Figure 5:
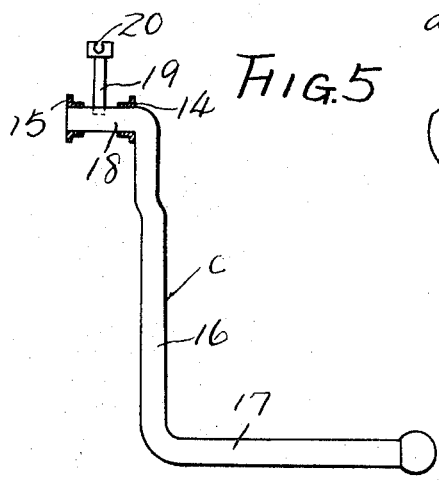
FIG. 5 is a schematic diagram of an auxiliary lever.
Figure 2:
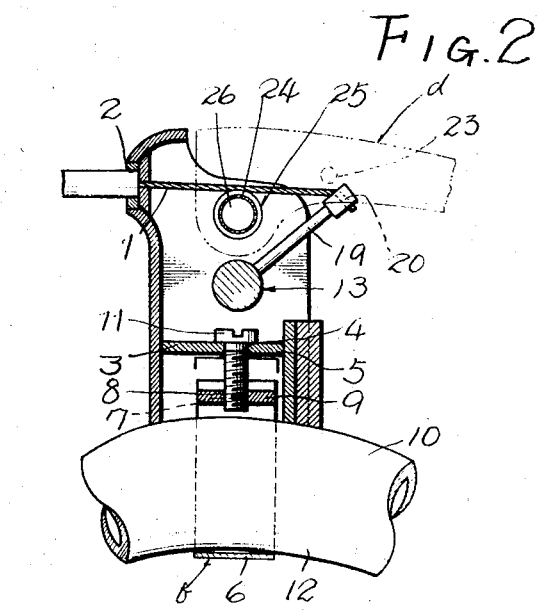
FIG. 2 is a vertical sectioned view of the bracket taken on the line A — A of FIG. 1.
Figure 4:
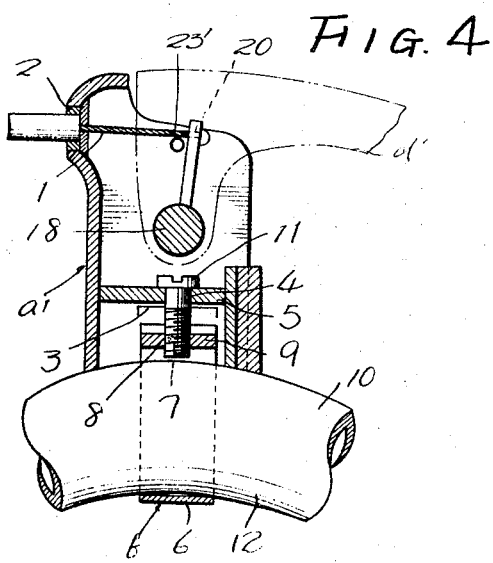
FIG. 4 is a vertical sectioned view showing another embodiment taken on the line A — A of FIG. 1.
Figure 6:
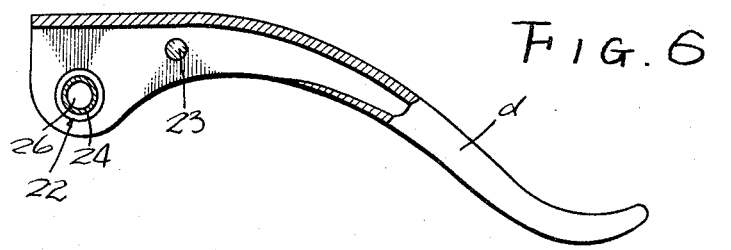
FIG. 6 is a schematic diagram of a main lever shown partially in an exploded form.

Setting forth in detail the present invention with reference to the accompanying drawings, reference character $a$ designates a bracket for fitting a brake lever to the drop handle portion of a bicycle. Said bracket $a$ is substantially comprised of a metal or other similar solid plate material formed into a prism shape. In the upper portion of one side of the bracket $a$ there is bored a hole 2 through which a wire rope 1 is inserted while somewhat downward of each center of the two opposed sides of the bracket $a$ there are provided notches 3 respectively. Said notches 3 may be very easily formed by pressing inwardly said portions adjacent to said centers. On the notches 3 there is mounted a washer 5 which is bored in its center with a hole 4.

On the other hand, the lower portion of said metal plate is curved in a substantially annular shape 6 to form a holding means $b$ which is at the opposed sides of the upper opening ends thereof provided with small holes or slots 7 into which there is inserted each projection of a nut means 9 having a center screw hole 8. The bracket to be used for fitting the brake lever to the drop handle according to the present invention is substantially constructed with the above-mentioned bracket $a$ and holding means $b$. In said annular metal plate portion 6 of the holding means $b$ is inserted a handle 10 while a screw bolt 11 is inserted in the screw holes 4 bored in the center of the washer 5 mounted on the notches 3 of the bracket $a$ in engageable relation with the screw holes 4 so as to tighten the screw bolt 11 thereby raising the holding means $b$ up to the level of the washer 5. In this manner, the lower surface of the bracket $a$ and the upper surface of the drop handle portion 10 are brought into contact with one another so that the bracket $a$ is fixedly mounted intermediate the U-shaped bent section of the drop handle 10.

Further in a substantially intermediate portion of the bracket $a$ is provided a hole 13 wherein an auxiliary lever $c$ to be subsequently referred to is movably supported through means of bushes 14, 15. Said auxiliary lever $c$ is made of metal or other similar solid rod-shaped materials and comprises a part 16, a part 17 extending from the lowest end of said part 16 at right angles therewith and a rod-shaped shaft 18 extending from the top of said part 16 in the direction opposed to the part 17, said both parts 16, 17 being integrally formed in a L-shaped configuration. The rod-shaped shaft 18 is provided thereon with a projection 19 which is perpendicular to the axis thereof and bored in its foremost end with a key-shaped hole 20 for retaining the terminal of the wire rope 1.

Figure 8:
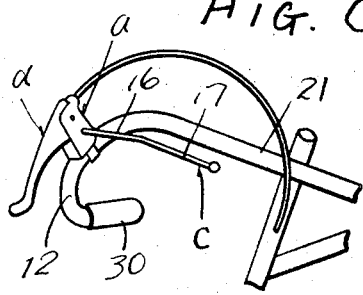
FIG. 8 shows how the main lever and the auxiliary lever are mounted.

As is clearly shown in FIG. 8, said auxiliary lever $c$ is pivotally supported in the shaft hole 13 through the bushes 14, 15 so that said part 16 is parallel to the plane of the U-shaped bent section 12 of the drop handle and said part 17 is parallel to the plane of the straight section 21 thereof.

Figure 7:
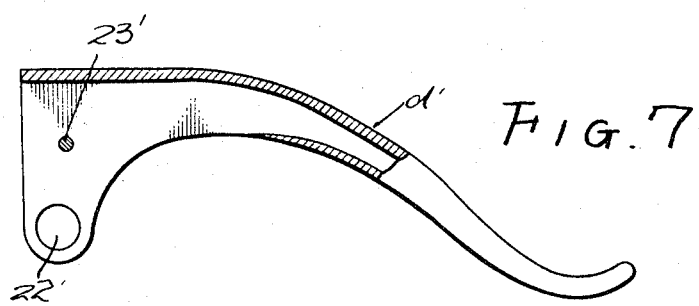
FIG. 7 is a schematic diagram of another embodiment of the main lever shown partially in an exploded form.

The main lever $d$ is made of metal or other similar solid plate materials and formed in a substantially reversed U-shaped configuration, comprising a shaft hole 22 disposed in its forward and downward position and a projection 23 disposed in somewhat upward and right handed position each with respect to the accompanying drawings. Said main lever $d$ is rotatably supported on the bracket $a$ by means of a small shaft 26 which passes through a hole 25 formed rightly above the shaft hole 13 of the bracket $a$. On said small shaft 26 there is sleeved a roller 24 which is annularly notched in its circumference. The terminal of the wire rope 1, the other terminal of which is connected to the position where brake shoes are adapted to actuate, is retained through said roller 24 on the projection 19 of the key-shaped hole 20 formed on the auxiliary lever $c$ located at the right handed side of the accompanying drawings. Further, a main lever $d'$ shown in FIG. 7 as a modification of the main lever $d$ is made of metal or other similar solid plate materials curved in a substantially U-shaped configuration and provided in its forward opposite position with a shaft hole 22' which is provided between both sides thereof with a projection 23' in a manner that said main lever $d'$ is rotatably mounted to a bracket $a'$ with said round rod-shaped shaft 18 inserted in the shaft hole 22'.

While the drop type bicycle handle brake of the present invention is constructed in the above-mentioned manner, the operation and functional effect thereof are as described in the following.

Figure 9:
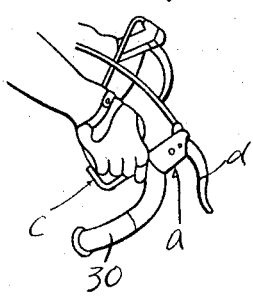
FIG. 9 is illustrative of a state where the drop handle and the auxiliary lever are both grasped with fingers in order to put on the brake when a bicycle is running at low speed.

Namely, when it is necessary for a cyclist to apply the brake when he is riding on a bicycle at low speed while grasping the straight section 21 of the drop handle, he can brake the bicycle by grasping together with the section 21 the part 17 of the auxiliary lever $c$ formed in parallel to the plane of the section 21 adjacent thereto, as is shown in FIG. 9. In this case, the auxiliary lever $c$ is moved about the shaft 18 regardless of the main lever $d$ or $d'$ whereby the wire rope 1 having its one terminal connected to the projection 19 formed on the auxiliary lever $c$ is pulled to control the brake; however, the movement of the auxiliary lever $c$ is carried out smoothly without frictional wear because said round rod-shaped shaft 18 is sleeved with the bushes 14, 15.

Figure 10:
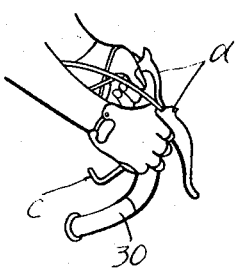
FIG. 10 is illustrative of a state where the bracket and the auxiliary lever are both grasped with fingers in order to put on the brake when a bicycle is running at medium speed.

Further, when it is necessary for a cyclist to apply the brake when he is riding on a bicycle at medium speed while grasping the bracket $a$ or $a'$, he can brake the bicycle by fingering together with the bracket $a$ or $a'$ the part 16 of the suxiliary lever $c$ formed in parallel to the plane of said U-shaped bent section 12 adjacent thereto, as is shown in FIG. 10, whereby the wire rope 1 is pulled to control the brake. In this case, the cyclist is able to put on the brake by grasping a portion of the auxiliary lever $c$ adjacent to the pivoted portion thereof because, as has been mentioned above, the auxiliary lever $c$ is moved about the bushes 14, 15 regardless of the main lever $a$ or $a'$ and the wire rope 1 is pulled by a small power through the roller 24 thereby to control the brake.

Figure 11:
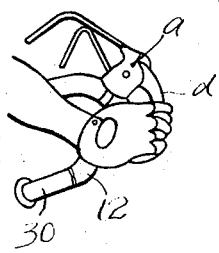
FIG. 11 is illustrative of a state where the grip portion of the drop handle and the main lever are both grasped when a bicycle is running at high speed.

Still further, when it is necessary for a cyclist to apply the brake when he is riding on a bicycle at high speed while grasping the lever portion of the U-shaped bent section 12, i.e., the portion rightly below the bracket $a$ or $a'$, he can brake the bicycle by grasping together with said lower portion the main lever $d$ or $d'$ as is shown in FIG. 11. In this case, the main lever $d$ or $d'$ is moved about the small shaft 26 whereby the projection 23 formed on the main lever $d$ or $d'$ presses the projection 19 formed on the auxiliary lever $c$ to pull the wire rope 1 and control the brake.

Incidentally, said small shaft 26 is sleeved with the roller 24 which is circumferentially grooved to receive the wire rope 1 in position so that the cyclist is able to pull the wire rope 1 with a small power through means of the main lever $d$ or $d'$ and the lower portion of the U-shaped bent section 12.

In the present embodiment of the invention, the main lever $d'$ is moved about the shaft portion 18 whereby a stopper rod 23' formed on the main lever $d'$ presses the projection 19 formed on the auxiliary lever $c$ thereby pulling the wire rope 1 to control the brake. In case the main lever $d$ or $d'$ is provided long in length so as to be parallel to the plane of a grip 30 adjacent thereto, which grip 30 being formed on the foremost end of the U-shaped bent section 12, it is possible for a cyclist to grasp the main lever together with the grip 30 so that he is able to control the brake with such a small power as has just been mentioned above.

However, if there is a danger that the main lever $d$ or $d'$ may be contacted, because of its increased length, with a portion of the grip 30 in a position to which it has been slightly moved, such a danger can be obviated for example by forming a notch on said portion of the grip 30 or modifying the configuration of the main lever $d$ or $d'$ in a manner that said lever $d$ or $d'$ stands in a line with said portion.

As has been clearly understood from the above description, the drop type bicycle handle brake in accordance with the present invention is featured with the main lever and the auxiliary lever both for operating the brake, irrespective of the position of his fingers grasping the drop handle, merely by grasping either the main lever or the auxiliary lever together with the drop handle. Thus it is to be noted that the advantageous features of the present invention over the aforesaid U. S. Letters Patent No. 3,403,577 resides wherein the brake of the invention can be directly actuated by operating the auxiliary lever when the bicycle is running at low or medium speed thereby effecting the braking operation exactly and pertinently.

Although the present invention has been described with reference to preferred embodiments, it is also to be understood that it is not to be so limited since changes and modifications may be made therein which are within the fully intended scope and spirit of this invention as hereinafter claimed.

What is claimed is:

1. A brake for bicycles adapted to be secured to a drop handle having a straight crossbar and curved forwardly and downwardly facing U-shaped bent sections at each end thereof comprising the following means,
   a. a bracket means adapted to be secured on a substantially intermediate portion of said U-shaped sections,
   b. a main lever rotatably supported on said bracket means,
   c. an auxiliary lever rotatably supported to said main lever in its lower portion,
   d. a projection on said main lever for retaining said main lever and said auxiliary lever,
   e. a brake operating wire rope which terminates to the foremost end of said auxiliary lever and fixed thereto.

2. An auxiliary lever according to claim 1 which is formed in a substantially L-shaped configuration with a first straight portion substantially in parallel to the axial direction of said bracket means and a second straight portion extending from said first straight portion and being provided in its foremost end with a round rod-shaped shaft extending in the direction opposed to said lower horizontal straight portion, the upper portion of said shaft being provided with a projection facing at right angles thereto and the top of said projection being bored with a hole for fixing a brake operating wire rope.

3. A main lever according to claim 1 which is provided downwardly and forwardly with a hole for inserting a small shaft to rotatably support said main lever on a bracket means, being provided upwardly and rearwardly of said hole with a projection extending in parallel to the axis of said hole.

4. A bracket means according to claim 1 which comprises a bracket body and a supporting means for fitting said bracket body to a drop handle portion, said bracket body being substantially in a prism shape having at least a pair of opposed sides inwardly pressed to form projections thereon in parallel relation to each other whereby a washer for receiving said supporting means is mounted on said projection in downwardly fixed relation.

5. A small shaft for rotatably supporting said main lever on said bracket means according to claim 3 which is sleeved with a roller circumferentially grooved so as to permit said wire rope to slidably move thereon.

6. A bracket means adapted to be secured to drop type bicycle handle having a straight crossbar and curved forwardly and downwardly facing U-shaped section at each end thereof comprising,
  a. a bracket means adapted to be secured on a substantially intermediate portion of said U-shaped bent section and comprising a small shaft,
  b. an auxiliary lever rotatably supported on said small shaft of said bracket means,
  c. a main lever rotatably supported on said small shaft,
  d. a projection on said main lever for retaining said auxiliary lever and said main lever, and
  e. a wire rope for operating the brake, which terminates to the foremost end of said auxiliary lever and fixed thereto.

7. A main lever according to claim 6 which is bored downwardly of its foremost end with a hole for inserting said small shaft to rotatably support said auxiliary lever on said bracket means, being provided rightly above said hole with a projection disposed in parallel to the axis thereof.

* * * * *